Aug. 9, 1927.  1,638,631
G. HANNAUER ET AL
TRACK BRAKE MECHANISM AND CONTROL MEANS THEREFOR
Filed May 15, 1925  2 Sheets-Sheet 1
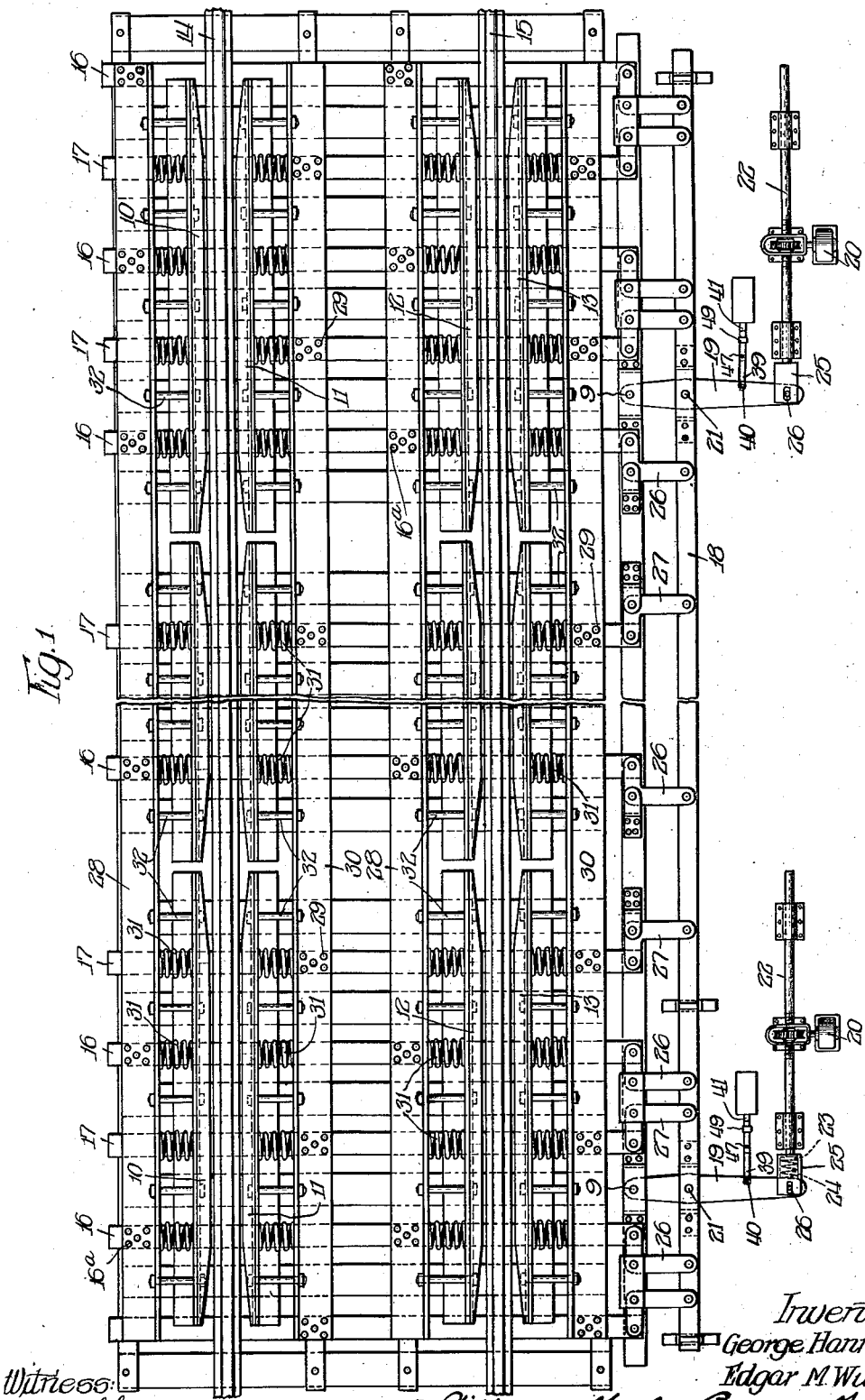
Witness:
R. Burkhardt.
Inventors:
George Hannauer,
Edgar M. Wilcox,
By Wilkinson, Huxley, Byron & Knight
attys.

Aug. 9, 1927.    1,638,631
G. HANNAUER ET AL
TRACK BRAKE MECHANISM AND CONTROL MEANS THEREFOR
Filed May 15, 1925    2 Sheets-Sheet 2
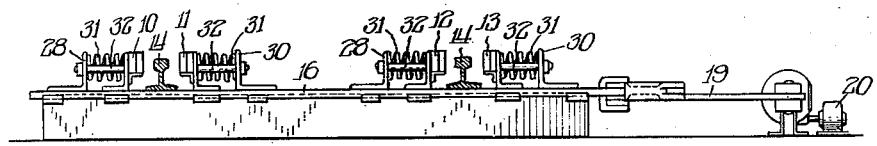
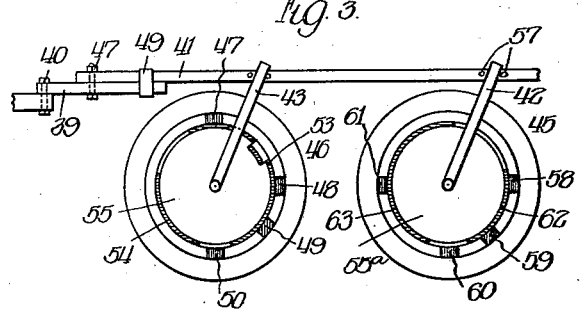
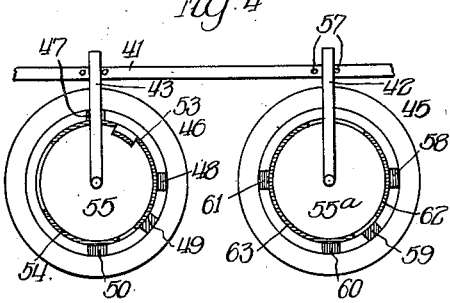
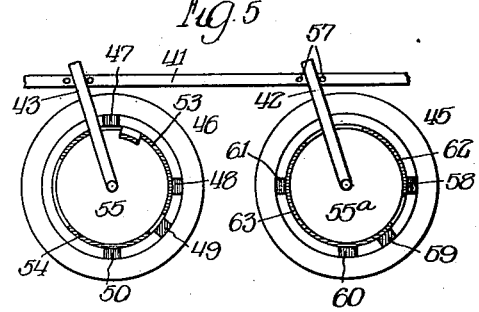
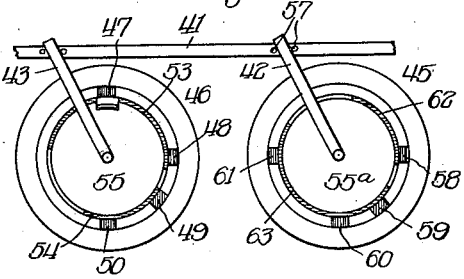
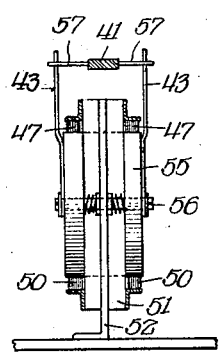
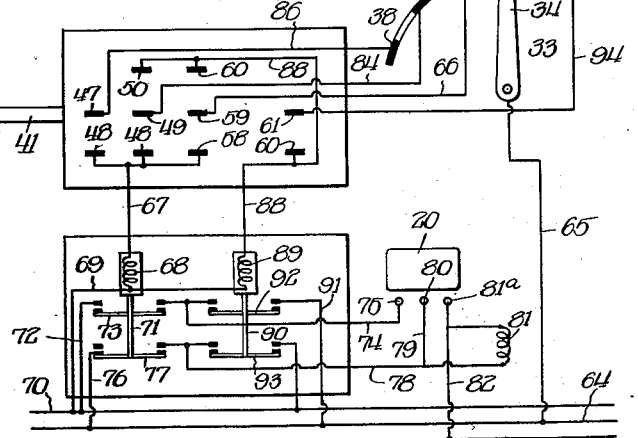
Witness:
G. Burkhardt
Inventors:
George Hannauer,
Edgar M. Wilcox,
By Wilkinson, Huxley, Byron & Knight attys.

Patented Aug. 9, 1927.

1,638,631

UNITED STATES PATENT OFFICE.

GEORGE HANNAUER, OF CALUMET CITY, ILLINOIS, AND EDGAR M. WILCOX, OF HAMMOND, INDIANA, ASSIGNORS TO HANNAUER CAR RETARDER COMPANY, OF CHICAGO, ILLINOIS, A CORPORATION OF ILLINOIS.

TRACK-BRAKE MECHANISM AND CONTROL MEANS THEREFOR.

Application filed May 15, 1925. Serial No. 30,433.

This invention relates to track brake mechanism and control means therefor, and is an improvement on the arrangement disclosed in our co-pending applications Serial No. 682,581, filed December 24, 1923, and Serial No. 757,105, filed December 20, 1924.

One object of our present invention is to provide simple, durable, reliable and efficient track brake mechanism and control means therefor, whereby the brakes are given definite controlled step-by-step graduated movements and positions for brake applying and brake releasing purposes and in a manner, whereby a wide range of braking pressures may be selectively exerted.

Another object is to provide track braking mechanism and control means therefor, as indicated above which is adapted to meet all of the requirements under service conditions.

These and other objects are accomplished by means of the arrangement disclosed on the accompanying sheets of drawings, in which Fig. 1 is a fragmentary top plan view of track brake mechanism and control means therefor, embodying our invention;

Fig. 2 is a fragmentary end view of the same arrangement, the track rails being shown in section;

Fig. 3, 4, 5 and 6 are side elevations of automatically actuated control members responsive to movements of the brakes somewhat diagrammatic and which cooperate to control motor circuit connections, the various figures showing different positions of said control parts;

Fig. 7 is an end view of one of the control members as shown in Figs. 3, 4, 5 and 6, and Fig. 8 is a diagrammatic view showing the electrical control system for controlling the operation of the track brakes.

The various novel features of the invention will be apparent from the following description and drawings and will be particularly pointed out in the appended claims.

Referring first to Fig. 1 of the drawings, it will be noted that the invention is illustrated in connection with track brakes 10, 11, 12 and 13 shown in a plurality of sections extending longitudinally of the track. Track brakes 10 and 11 are mounted on opposite sides of one rail 14 and track brakes 12 and 13 are mounted on the opposite sides of the other rail 15. As fully described in our co-pending application Serial No. 682,581, filed December 24, 1923, the track brakes 10 and 12 in their brake application movements are yieldably pressed in one direction through spaced transversely arranged members 16 and track brake members 11 and 13 are yieldably pressed in the opposite direction through spaced transversely arranged members 17. Said members 16 and 17 respectively are operatively connected to a primary actuating bar 18, which in turn is actuated in opposite directions through levers 19 fulcrumed at points 9 and pivotally connected at intermediate points 21 to the bar 18. The other or outer end of each lever 19 is connected to a source of power which in this instance takes the form of electric motors 20. Each electric motor 20 is suitably geared to and drives a suitably supported screw rod 22. Each screw rod 22 has at one of its ends a head 23 in engagement with a coil spring 24 mounted in a pocket member 25, in turn loosely connected at 26 to the outer end of the associated actuating lever 19. From the arrangement thus far described, it will be appreciated that when the motors 20, through the connection described, move the bar 18 to the left as shown in Fig. 1 the track brakes will be given braking movements transversely of the rails for engaging opposite sides of the car wheels, and when the bar 18 is moved to the right as shown in said figure, said track brakes will be given a releasing movement.

Various details of the track brake mechanism have not been described in detail as they are described in co-pending application Serial No. 682,581, suffice it to say, however, that the transversely extending members 16 are connected to the primary actuating bar 18 through bell crank levers 26 and transversely extending members 17 are connected to the primary bar 18 through bell crank levers 27. The transversely extending members 16 are bolted or riveted as at 16ª to associated angle backing bars 28 and the transversely extending members 17 are riveted or otherwise secured as at 29 to their associated backing bars 30. Coil springs 31 are interposed between the backing bars 28 and 30 and the associated brake shoe, whereby the braking pressures are yieldably transmitted to opposite sides of the car wheels. Rods 32 having heads and nuts and operatively secured to the brake shoes extend through openings in the vertical flanges of the backing members 28 and 30 and limit the separating movement between associated brake shoes and backing bars.

It is important that graduated braking pressures be used because of varying conditions, for example, a greater braking pressure is required for retarding a heavy or loaded car than is required for a light or unloaded car. It is also important to release the brakes quickly for the reasons set forth in our co-pending application Serial No. 757,105, as for example, if for any reason a car wheel should attempt to climb the brake shoes and move vertically away from the associated rails.

In this application we have disclosed an electrical system for controlling the application and release of the brakes whereby the brake shoes are given controlled definite step-by-step graduated positions for brake applying and releasing purposes and in a manner whereby a wide range of braking pressures may be selectively exerted.

In this electrical control system a multiple circuit master controller 33 is used having a control handle 34 and associated contact segments 35, 36, 37 and 38. When the controller handle 34 is in electrical engagement with segment 35 electrical connections are made for operating the motors 20 for releasing the brakes. When the controller handle 34 is in engagement with any of the other associated contacts 36, 37 and 38, electrical connections are established for driving the motors 20 for selectively positioning the brake shoes in definite graduated positions for exerting different definite braking pressures both in brake application and brake releasing movements. The control mechanism also includes a rod 39 pivotally connected as at 40 to the associated operating lever 19 slightly inwardly from the outer end thereof, said rod being adjustably connected to another rod 41 in turn operatively connected to handles 42 and 43 of circuit controlling members 45 and 46, respectively. The adjustable connection between the rods 39 and 40 includes a bolt 47' secured in one rod 41 and movable in a slot 48' in the other. The bolt 47' in traveling through the slot 48' is adapted to engage one end of the slot and also an adjustably mounted band 49' secured to the slotted bar 39, so that the travel of the bolt 47' is limited in two directions. The function of the loose connection between the rods 39 and 41 is to take up slack in the brake mechanism during the application and releasing of the brakes.

The controlling member 46 includes brushes 47, 48, 49 and 50 which are secured to an insulated stationary contact holder 51 mounted upon a supporting frame 52. These brushes are adapted to electrically contact with interconnected conducting segments 53 and interconnected conducting segments 54 of a drum 55 mounted to rotate on a pivot pin 56, the arms 43 being secured to said drum 55 at opposite sides thereof and connected to the operating bar 41 through the pins 57 carried thereby. The associated circuit controlling member 45 is similarly constructed and has stationary contact brushes 58, 59, 60 and 61 adapted to electrically contact with interconnected conducting segments 62 and interconnected conducting segments 63. The contact brushes 47, 48, 49, 50, 58, 59, 60 and 61 are illustrated diagrammatically in Fig. 8 in connection with the main controller 33.

From the arrangement above described it will be understood that if it is desired to set the brake members 10 and 11 and 12 and 13 in what may be termed their first braking position, wherein, for example, the cooperating brake shoes on either side of a rail are spaced five inches apart to receive therebetween car wheels, which are five and one-half inches thick at the point of engagement, the main control lever 34 is moved into engagement with contact 36 when the other circuit-controlling members are arranged as shown in Fig. 3. Under such circumstances a circuit is established from main 64 through conductor 65, control handle 34, contact 36, conductor 66, brush 59, control segment 62 (see Fig. 3) brush 58, conductor 67 (see Fig. 8), solenoid coil 68, conductor 69 and main 70. Completing this circuit energizes the coil 68 for raising the switch 71 and closing the circuits of motor 20 for applying the track brakes. From the main 70 the motor circuit includes a conductor 72, switch member 73 and conductor 74 terminating in a motor terminal 75. The balance of the circuit extends from main 64 and includes a conductor 76, switch member 77, conductors 78 and 79, the latter of which is connected to motor terminal 80. A coil winding 81 also is energized and the circuit is completed through a conductor 82 connected to motor terminal 81ª and main 83 for the purpose of releasing the brakes connected with the motor. In other words, when the coil 81 is deenergized, the brakes are set for stopping the motor. When the coil 81 is energized, the motor brakes are released. With the motor circuit thus completed through the switch members 73 and 77, the motor 20 operates to move the associated track brake shoes toward each other for gripping car wheels traversing the tracks. The brake applying movements of the brakes continue until the electrical connections hereinabove described are changed. Referring for the moment to Fig. 1, in connection with Figs. 3 to 8 inclusive, it will be appreciated that when the motor 20 first starts its brake applying driving action such action is absorbed in taking up the slack in the braking mechanism represented by the pin and slot connection between the bar members 39 and 41, and, as soon as the slack is eliminated, the brakes are given brake applying movements. During such brake applying movements the outer ends of the levers 19 are moved to the left, thereby moving the controller bar 41 to the left, which causes a counterclockwise rotative movement of the drums bearing the contact segments. With the controller handle 34 on the controller segment 36, the contact drums 55 and 55ª will move from the position shown in Fig. 3 to the position shown in Fig. 4, causing the circuit connections to be broken as a result of drum contact segment 62 passing out of engagement with brush 59, as shown in Fig. 4. As a result thereof, the circuit through the solenoid coil 68 is broken and accordingly the circuit of the actuating motor 20 is broken at the switch contacts 73 and 77. During the operation thus far described the brakes 10 and 11 and also 12 and 13 have been actuated into their first graduated braking position and stopped in such position as the result of the control hereinabove described. As mentioned above, in this position of the brake shoes they are five inches apart, and, due to their spring backing, they yieldably receive the car wheels which are five and one-half inches wide, thereby exerting a yieldable braking pressure commensurate with the position of said brake shoes. The spring backing bars 28 and 30 are locked in any position in which they are set by virtue of the threaded drive between the motor 20 and rods 22.

If it is now desired to move said brakes into their second graduated braking position, in which, for example, the braking members are four and three-quarters inches apart, the controller handle 34 may be moved into engagement with the segment 37, whereupon a circuit is established from main 64 through conductor 65, controller handle 34, segment 37, conductor 84, brush 49, drum segment 53 (see Fig. 4), brush 48, conductor 67 (see Fig. 8), solenoid coil 68 and conductor 69 to main 70, whereupon switch members 73 and 77 are moved into closed position for completing the circuit of the motor 20. The motor 20 will then give the brakes an additional brake applying movement until the control circuits again are broken. This will occur when the drums have moved from the position shown in Fig. 4 to the position shown in Fig. 5, wherein the circuit is broken between the drum segment 53 and brush 49, resulting in deenergizing of the solenoid coil 68 and opening of the motor switches 73 and 77. A yieldable braking action with increased pressure results.

If it is now desired to move the brakes into a third graduated position, such for example wherein the brakes are but four and one-half inches apart for giving the maximum braking action, the control handle 34 is moved into engagement with segment 38, whereupon a circuit is established from main 64 through conductor 65, control handle 34, contact 38, conductor 86, brush 47 (see Fig. 5), drum segment 53, brush 48 (see Fig. 8), conductor 67, solenoid coil 68, conductor 69 to main 70 whereupon the circuit of the motor 20 is closed through switch members 73 and 77. This third graduated brake applying movement will continue until as a result of continued lefthand movement of the levers 19 the circuit is broken between drum segments 53 and brush 47, as shown in Fig. 6 whereupon, through the deenergization of solenoid coil 68 the circuit of the motor will be broken at the switch members 73 and 77. A yieldable braking action with increased pressure results.

It is seen, therefore, that the track brakes or retarding members are applied step by step with an increasing yieldable pressure as a result of definitely positioning said brakes closer and closer together. The circuit of the actuating motor is completed by a movement of one controller for actuating the brakes, and the motor circuit is automatically broken by another controller member which is actuated in response to a predetermined movement of the brakes.

Thus far only the brake applying movements in one direction have been considered. The brakes may be released step by step by a reverse action. Let it be assumed that the control parts are as shown in Fig. 6 and the control handle 34 in Fig. 8 is in engagement with contact segment 38 and it is desired to reduce the braking action a given amount wherein the brake shoes, for example, are four and three-quarters inches apart. To do this the control handle 34 is moved in a reverse manner into engagement with contact segment 37 for establishing a circuit from main 64 through conductor 65, handle 34, contact segment 37, conductor 84, brush 49, drum segment 54 (see Fig. 6), brush 50, (see Fig. 8), conductor 88, solenoid coil 89, conductor 69 to main 70, causing the switch 90 to be actuated to close the motor circuit for giving the motor a reverse rotation. The motor circuit will then be completed from the main 64 through conductor 91, switch member 92 and conductor 74 to motor terminal 75. The balance of the motor connection will be from main 70 through switch member 93, conductors 78 and 79 to motor terminal 80. The motor 20 will then be driven for releasing the brakes a given amount. This releasing movement will continue until the drum segment 54 has been rotated in a clockwise direction out of engagement with the brush 49, as shown in Fig. 5, whereupon the circuit of the solenoid coil 89 will be interrupted for causing the motor switches 92 and 93 to be opened.

If it is then desired to release the brakes an increased amount or into position, for example, where they are five inches apart, the controller handle 34 may be moved into engagement with contact segment 36 for establishing a circuit from main 64 through conductor 65, controller handle 34, contact segment 36, conductor 66, brush 59 (see Fig. 5), contact segment 63, brush 60 (see Fig. 8, the upper diagrammatic brush 60), conductor 88, solenoid coil 89 and conductor 69 to main 70. Upon the energization of the solenoid coil 89 the motor switches 92 and 93 are again closed and the motor 20 actuates the brakes for releasing them a given amount until the drum contact segment 63 is rotated in a clockwise direction out of engagement with the brush 59, as shown in Fig. 4. Such causes the deenergization of the solenoid coil 89 and opens the circuit of the motor 20 at the switch members 92 and 93.

If it is desired to move the brakes into the full release position, the same may be accomplished by moving the controller handle 34 into engagement with contact segment 35, whereupon a circuit is established from main 64, through conductor 65, controller handle 34, segment 35, conductor 94, brush 61 (see Fig. 4) drum contact segment 63, brush 60 (see Fig. 8, the lower diagrammatic brush 60), conductor 88, solenoid coil 89, conductor 69 to main 70. The circuit of the motor 20 is then closed again through the switch members 92 and 93 for further releasing the brakes, it being understood during all of the brake releasing movements the outer ends of levers 19 are moved to the right, as viewed in Fig. 1, for rotating the segment drums 55 and 55ª in a clockwise direction, as viewed in Figs. 3, 4, 5 and 6.

This last brake releasing movement will continue until the segment 63 has moved out of engagement with said brush 60, as shown in Fig. 3, whereupon the circuit of the solenoid coil 89 will be interrupted and the motor circuit broken by the switch members 92 and 93.

By means of this control arrangement the brakes are given controlled definite step-by-step graduated movements and positions for brake applying and releasing purposes and in a manner whereby a wide range of braking pressures are selectively exerted. It will be understood that while the motors and associated switches preferably will be located directly adjacent the track brakes, the master controller preferably will be located in a tower for remote control. In this way a single tower-man may control many different units distributed throughout the switch yards.

It is our intention to cover all modifications of the invention falling within the spirit and scope of the following claims.

We claim:

1. Track brake apparatus for railroads comprising retarding means coacting with the car wheels, a motor for actuating said retarding means, and multiple circuit control means for controlling said motor whereby said retarding means may exert graduated braking pressures.

2. Track brake apparatus for railroads comprising retarding means coacting with the car wheels, a motor for actuating said retarding means, and multiple circuit control means for controlling said motor whereby said retarding means may selectively exert graduated braking pressures.

3. Track brake apparatus for railroads comprising brake members adapted to engage opposite sides of a car wheel, a motor for moving said brake members toward each other for clasping the car wheel, and multiple circuit control means for controlling said motor whereby said brake members may exert graduated braking pressures.

4. Track brake apparatus for railroads comprising brake members adapted to engage opposite sides of a car wheel, a motor for moving said brake members towards each other for clasping the car wheels, and multiple circuit control means for controlling said motor whereby said brake members may selectively exert graduated braking pressures.

5. Track brake apparatus for railroads comprising a brake member for engaging a car wheel, a motor for actuating said brake member, and multiple circuit control means for controlling the position of said brake member with respect to the car wheel for exerting graduated braking pressures against the car wheel.

6. Track brake apparatus for railroads comprising retarding means coacting with the car wheels, a motor for actuating said retarding means, and multiple circuit control means for controlling a step-by-step movement of said retarding means for exerting graduated braking pressures.

7. Track brake apparatus for railroads comprising retarding means coacting with the car wheels, an electric motor for actuating said retarding means, and multiple circuit control means for controlling the actuation of said motor whereby said retarding means is given a step-by-step braking movement for exerting different definite braking pressures.

8. Track brake apparatus for railroads comprising retarding means coacting with the car wheels, a motor for actuating said retarding means, and multiple circuit control means for said motor for selectively positioning said retarding means for exerting graduated braking pressures.

9. Track brake apparatus for railroads comprising retarding means coacting with the car wheels, a motor for actuating said retarding means, and multiple circuit control means for said motor for positioning said retarding means step by step for exerting graduated braking pressures.

10. Track brake apparatus for railroads comprising retarding means coacting with the car wheels, an electric motor for actuating said retarding means, and multiple circuit control means for said motor for selectively positioning said retarding means for exerting graduated braking pressures.

11. Track brake apparatus for railroads comprising retarding means coacting with the car wheels, a motor for actuating said retarding means, and multiple circuit control means for controlling the actuation and stoppage of said motor, whereby said retarding means may exert graduated braking pressures.

12. Track brake apparatus for railroads comprising retarding means coacting with the car wheels, an electric motor for actuating said retarding means, and multiple circuit control means for said motor for controlling the actuation and stoppage of said motor for selectively positioning said retarding means for exerting graduated braking pressures.

13. Track brake apparatus for railroads comprising retarding means coacting with the car wheels to exert controlled step by step graduated braking pressures, a motor for actuating said retarding means, and control means responsive to a movement of said retarding means for controlling the actuation of the motor.

14. Track brake apparatus for railroads comprising railroad car retarding means to exert controlled step by step graduated braking pressures, means for actuating said retarding means for braking purposes, and means responsive to movement of said retarding means for controlling said actuating means.

15. Track brake apparatus for railroads comprising railroad car retarding means to exert controlled step by step graduated braking pressures, means for actuating said retarding means for braking purposes, and means associated with said actuating means and responsive to a movement of said retarding means for controlling said actuating means.

16. Track brake apparatus for railroads comprising retarding means for railroad cars to exert controlled step by step graduated braking pressures, a motor for actuating said retarding means for braking purposes, and means for automatically controlling said motor for controlling the extent of actuation of said retarding means.

17. Track brake apparatus for railroads comprising retarding means for railway cars to exert controlled step by step graduated braking pressures, an electric motor for actuating said retarding means for braking purposes through a plurality of different circuits, and means for controlling the circuit connections of said electric motor for controlling the actuation of said motor and positioning of said retarding means.

18. Track brake apparatus for railroads comprising retarding means coacting with the car wheels to exert controlled step by step graduated braking pressures, means for actuating said retarding means, and means responsive to an actuation of said retarding means for controlling actuating movement of said actuating means.

19. Track brake apparatus for railroads comprising retarding means coacting with car wheels to exert controlled step by step graduated braking pressures, an electric motor for actuating said retarding means, and circuit control means responsive to movement of said retarding means for controlling said motor.

20. Track brake apparatus for railroads comprising brake members adapted to engage opposite sides of a car wheel, a motor for actuating said brake members towards each other, and control means responsive to a predetermined actuation of said brake members for controlling said motor, whereby step-by-step graduated braking pressures are exerted.

21. Track brake apparatus for railroads comprising retarding means coacting with the car wheels, a motor, a member through which said motor actuates said retarding means, and multiple circuit control means operatively associated with said member for controlling said motor, whereby said retarding means may exert graduated braking pressures.

22. Track brake apparatus for railroads comprising retarding means for railroad cars, a motor, a member through which said motor actuates said retarding means, and control means actuated by said member for controlling said motor, whereby said retarding means may exert graduated braking pressures.

23. Track brake apparatus for railroads comprising retarding means coacting with the car wheels, an electric motor, a member through which said motor actuates said retarding means, and circuit control means operatively associated with said member for controlling said motor whereby said retarding means may exert graduated braking pressures.

24. Track brake apparatus for railroads comprising car retarding means to exert controlled step by step graduated braking pressures, means for actuating said retarding means, and means operatively associated with said retarding means and actuating means for controlling the actuating movement of the latter.

25. Track brake apparatus for railroads comprising car retarding means to exert controlled step by step graduated braking pressures, means for actuating said retarding means, and means operatively associated with said retarding means and actuating means for automatically controlling the actuating movement of the latter.

26. Track brake apparatus for railroad cars comprising car retarding means, means for actuating said car retarding means, and control means interconnected with said retarding means and said actuating means for controlling a step-by-step movement of said retarding means.

27. Track brake apparatus for railroads comprising a brake member adapted to engage a car wheel, means for actuating said brake member, and control means interconnected with said brake member and actuating means for controlling a step-by-step movement of said brake member, whereby graduated braking pressures are exerted.

28. Track brake apparatus for railroads comprising a brake member adapted to engage a car wheel, an electric motor for actuating said brake member, and circuit control means operatively associated with said brake member and motor whereby said brake member is given a step-by-step movement for exerting graduated braking pressures.

29. Track brake apparatus for railroads comprising railroad car retarding means, a motor for actuating said retarding means, and multiple circuit control means for controlling said motor, whereby said retarding means is given step-by-step brake applying and brake releasing movements.

30. Track brake apparatus for railroads comprising a brake member adapted to coact with the car wheel, a motor for actuating said brake member, and multiple circuit control means for controlling step-by-step brake applying and brake releasing movement of said brake member for exerting graduated braking pressures.

31. Track brake apparatus for railroads comprising a brake member adapted to engage a car wheel, a motor for actuating said brake member, yieldable means interposed between said motor and said brake member whereby the braking pressures are yieldably applied, and multiple circuit control means for controlling said motor whereby said brake member may exert graduated braking pressures.

32. Track brake apparatus for railroads comprising braking elements for engaging car wheels, brake actuating means, yieldable means interposed between said braking elements and actuating means, and control means associated with said actuating means whereby predetermined graduated yieldable braking pressures may be exerted.

33. The combination with a track rail, of a brake member on each side of said rail arranged to contact with a wheel thereon, means for actuating said brake members, yieldable means interposed between said brake members and actuating means for yieldably transmitting braking pressures to said braking members, and control means responsive to movements of said brake members for controlling said actuating means, whereby graduated braking pressures are exerted.

34. The combination with a track rail, of a brake member at one side of said rail arranged to contact with a wheel thereon, means for actuating said brake member, yieldable means interposed between said brake member and actuating means for yieldably transmitting braking pressures to said brake member, and control means responsive to movement of said brake member for controlling said actuating means whereby graduated braking pressures are exerted.

35. The combination with a pair of track rails, of a transversely movable brake member on each side of each rail adapted to clasp a wheel for the retarding movement of the latter, means for actuating said brake members simultaneously, yieldable means interposed between said actuating means and said brake members for yieldably applying all of the brake members at substantially the same pressure, and control means responsive to movement of said brake members for controlling the exertion of graduated braking pressures.

36. Track brake apparatus for railroads comprising retarding means coacting with the car wheels, a motor for actuating said retarding means, and multiple circuit control means for controlling said motor whereby said retarding means may be set in different definite positions before being engaged by a car wheel for exerting graduated braking pressures.

37. Track brake apparatus for railroads comprising retarding means coacting with the car wheels, a motor for actuating said retarding means, multiple circuit control means for controlling said motor whereby said retarding means may be set in different definite positions before being engaged by a car wheel for exerting graduated braking pressures, and means for yieldably locking said retarding means in said definite positions.

38. Track brake apparatus for railroads comprising brake members coacting with the car wheels, springs pressing against said brake members, movably mounted backing members for said springs, a motor for actuating said backing members into different definite positions for causing said brake members to exert graduated braking pressures against said car wheels, and multiple circuit control means for controlling the positioning of said backing members and brake members.

39. Track brake apparatus for railroads comprising brake members coacting with the car wheels, springs pressing against said brake members, movably mounted backing members for said springs, a motor for actuating said backing members into different definite positions for causing said brake members to exert graduated braking pressures against said car wheels, multiple circuit control means for controlling the positioning of said backing members and brake members, and means for locking said backing members in said positions.

40. Track brake apparatus for railroads comprising retarding means coacting with the car wheels, a motor for actuating said retarding means, and multiple circuit control means for controlling the actuation and stopping of said motor whereby said retarding means may exert graduated braking pressures in accordance with known total weight of a car and its lading.

Signed at Chicago, Illinois, this twelfth day of May, 1925.

GEORGE HANNAUER.
EDGAR M. WILCOX.